(12) United States Patent
Ka et al.

(10) Patent No.: US 12,105,943 B2
(45) Date of Patent: Oct. 1, 2024

(54) ELECTRONIC DEVICE AND CONTROL METHOD THEREFOR

(71) Applicant: SAMSUNG ELECTRONICS CO., LTD., Suwon-si (KR)

(72) Inventors: Keehwan Ka, Suwon-si (KR); Sunhyung Kim, Suwon-si (KR); Sanga Kim, Suwon-si (KR); Yeonghyeok Kim, Suwon-si (KR); Seoyeon Lee, Suwon-si (KR); Najeong Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/113,817

(22) Filed: Feb. 24, 2023

(65) Prior Publication Data

US 2023/0221844 A1 Jul. 13, 2023

Related U.S. Application Data

(63) Continuation of application No. PCT/KR2021/011664, filed on Aug. 31, 2021.

(30) Foreign Application Priority Data

Sep. 18, 2020 (KR) .................. 10-2020-0120938

(51) Int. Cl.
*G06F 3/048* (2013.01)
*G06F 3/04842* (2022.01)
*G06F 3/01* (2006.01)

(52) U.S. Cl.
CPC .............. *G06F 3/04842* (2013.01)

(58) Field of Classification Search
CPC ............ G06F 3/048; G06F 3/04842; H04M 12/72403; H04M 1/725; G06Q 50/10
See application file for complete search history.

(56) References Cited

U.S. PATENT DOCUMENTS 9,226,093 B2 12/2015 Park et al.
10,289,085 B2 * 5/2019 Jeong .................. F16M 11/18
(Continued)

FOREIGN PATENT DOCUMENTS

JP 2006-309628 11/2006
JP 4237695 3/2009
(Continued)

OTHER PUBLICATIONS

International Search Report, PCT/ISA/210, dated Dec. 27, 2021, in PCT Application No. PCT/KR2021/011664.
(Continued)

*Primary Examiner* — Nicholas Augustine
(74) *Attorney, Agent, or Firm* — STAAS & HALSEY LLP

(57) ABSTRACT

A controlling method of an electronic apparatus is provided. The controlling method of the electronic apparatus according to an embodiment includes displaying cooking description information for one cooking step from among a plurality of cooking steps included in recipe information, receiving other cooking description information that can replace the displayed cooking description information from an external device, classifying the received other cooking description information according to a predetermined criterion, displaying the classified other cooking description information, and based on one of the displayed other cooking description information being selected, updating the recipe information by replacing the displayed cooking description information with the selected other cooking description information.

19 Claims, 10 Drawing Sheets

(56) References Cited

U.S. PATENT DOCUMENTS

| | | | |
|---|---|---|---|
| 11,201,935 B2* | 12/2021 | Ren | G06F 16/90335 |
| 11,250,714 B2 | 2/2022 | Lim | |
| 11,366,437 B2* | 6/2022 | Mahapatra | H05B 6/6464 |
| 11,721,053 B2* | 8/2023 | Yeon | H04N 23/60 |
| | | | 382/190 |
| 2002/0171674 A1* | 11/2002 | Paris | G06Q 99/00 |
| | | | 715/700 |
| 2010/0280895 A1* | 11/2010 | Mottola | G06Q 30/0223 |
| | | | 705/14.1 |
| 2010/0292998 A1 | 11/2010 | Bodlaender et al. | |
| 2011/0055044 A1* | 3/2011 | Wiedl | G06Q 30/0282 |
| | | | 705/347 |
| 2012/0322032 A1* | 12/2012 | Smith | G06Q 30/0633 |
| | | | 434/127 |
| 2014/0324607 A1* | 10/2014 | Frehn | G06Q 50/12 |
| | | | 705/15 |
| 2015/0119003 A1 | 4/2015 | Park et al. | |
| 2015/0220592 A1* | 8/2015 | Robberechts | G06F 3/0482 |
| | | | 715/810 |
| 2015/0290795 A1* | 10/2015 | Oleynik | A47J 36/321 |
| | | | 700/257 |
| 2018/0082603 A1 | 3/2018 | Lim | |
| 2019/0231113 A1* | 8/2019 | Young | G05B 19/042 |
| 2020/0349860 A1* | 11/2020 | Vengroff | A47J 36/321 |
| 2023/0140551 A1* | 5/2023 | Maeda | G01C 21/3641 |
| | | | 701/400 |
| 2023/0252103 A1* | 8/2023 | Lin | G06F 16/951 |
| | | | 707/722 |
| 2024/0008674 A1* | 1/2024 | Jenkins | A47J 27/62 |

FOREIGN PATENT DOCUMENTS

| | | |
|---|---|---|
| JP | 2009-100351 | 5/2009 |
| JP | 2009-531768 | 9/2009 |
| JP | 2019-61366 | 4/2019 |
| JP | 2019-87225 | 6/2019 |
| JP | 2019-164585 | 9/2019 |
| JP | 2020-107299 | 7/2020 |
| KR | 10-2018-0032234 | 3/2018 |
| KR | 10-2018-0071595 | 6/2018 |
| KR | 10-1982240 | 5/2019 |
| KR | 10-2052409 | 12/2019 |
| KR | 10-2097638 | 4/2020 |

OTHER PUBLICATIONS

Written Opinion, PCT/ISA/237, dated Dec. 27, 2021, in PCT Application No. PCT/KR2021/011664.

* cited by examiner

FIG. 4B

Tenderloin Steak Recipe

STEP3

After adding olive oil to a frying pan, put 300g of meat and cook over medium heat for 7 minutes

⋮

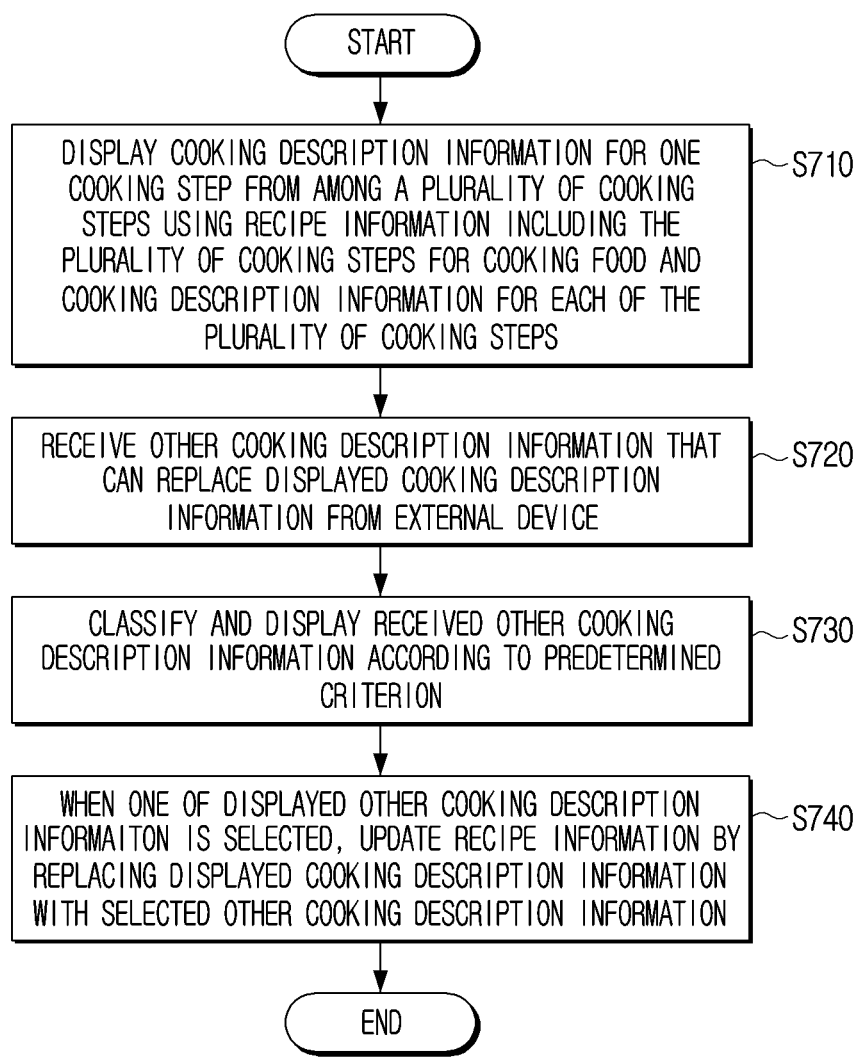

ELECTRONIC DEVICE AND CONTROL METHOD THEREFOR

CROSS-REFERENCE TO RELATED APPLICATIONS

This application is a continuation application of International Application PCT/KR2021/011664, filed Aug. 31, 2021, and claims foreign priority to Korean application 10-2020-0120938 filed Sep. 18, 2020, the disclosures of which are incorporated herein by reference.

BACKGROUND

1. Field

This disclosure relates to an electronic apparatus and a controlling method thereof and more particularly, to an electronic apparatus that provides a method of cooking food and a controlling method thereof.

2. Description of Related Art

Recently, with the development of media technology and communication technology, various contents are created and shared among users. Among them, as interest in food culture increases, the number of users who create and share various cooking contents is gradually increasing. In particular, some users create new recipes or update well-known recipes in order to share their own cooking methods with others.

Since the recipe created in this way is created from the perspective of the user who created the recipe, there is a problem in that a user who wants to cook food according to the recipe must have the same ingredients or cooking device as the user who created the recipe.

In addition, since the recipe is created from the perspective of the recipe creator and delivered unilaterally, it is difficult for a user who is not familiar with cooking to modify some of the cooking steps included in the recipe according to his or her circumstances or tastes.

SUMMARY

A controlling method of an electronic apparatus according to an embodiment includes displaying cooking description information for one cooking step from among a plurality of cooking steps included in recipe information, receiving other cooking description information that can replace the displayed cooking description information from an external device, classifying the received other cooking description information according to a predetermined criterion, displaying the classified other cooking description information, and based on one of the displayed other cooking description information being selected, updating the recipe information by replacing the displayed cooking description information with the selected other cooking description information.

According to an embodiment the classifying includes identifying a difference from the received other cooking description information based on the display cooking description information, and classifying the identified difference according to the predetermined criterion.

According to an embodiment the classifying includes identifying a difference in at least one of taste of food, type of food, amount of food, or cooking device.

According to an embodiment the classifying includes selecting at least one other cooking description information from the received other cooking description information based on user preference information; and classifying the selected at least one other cooking description information according to the predetermined criterion, wherein the user preference information includes user preference information regarding at least one of taste of food, type of food, amount of food, or cooking device.

According to an embodiment, the classifying includes classifying at least one other cooking description information according to the predetermined criterion based on the user preference information.

According to an embodiment, the method further includes updating user preference information based on the selected other cooking description information.

According to an embodiment, the receiving other cooking description information includes, based on information on a cooking device or ingredients owned by a user of the electronic apparatus, receiving other cooking description information including a cooking device or ingredients owned by the user.

According to an embodiment, the method further includes identifying a cooking device included in the selected other cooking description information, and generating a setting command of the identified cooking device based on the selected other cooking description information and transmitting the setting command to the identified cooking device.

According to an embodiment, the method further includes, by analyzing a content including the plurality of cooking steps, generating recipe information regarding the content, and further includes obtaining at least one information from among information on ingredients or cooking device owned by a user of the electronic apparatus, or the user's health information, and generating personal recipe information using the generated recipe information and the obtained at least one information, wherein the displaying cooking description information includes displaying cooking description information regarding one cooking step from among the plurality of cooking steps using the personal recipe information.

An electronic apparatus according to another embodiment includes a display, a communication interface configured to perform communication with an external device, and a processor configured to control the display to display cooking description information for one cooking step from among a plurality of cooking steps included in recipe information, receive other cooking description information that can replace the displayed cooking description information from an external device through the communication interface, classify the received other cooking description information according to a predetermined criterion, control the display to display the classified other cooking description information, and based on one of the displayed other cooking description information being selected, update the recipe information by replacing the displayed cooking description information with the selected other cooking description information.

According to an embodiment, the processor is configured to identify a difference from the received other cooking description information based on the displayed cooking description information, classify the identified difference according to the predetermined criterion, and control the display to display the classified identified difference.

According to an embodiment, the processor is configured to identify a difference in at least one of taste of food, type of food, amount of food, or cooking device.

According to an embodiment, the processor is configured to select at least one other cooking description information from the received other cooking description information based on user preference information; and classify the selected at least one other cooking description information according to the predetermined criterion, wherein the user preference information includes user preference information regarding at least one of taste of food, type of food, amount of food, or cooking device.

According to an embodiment, the processor is configured to classify the selected at least one other cooking description information according to the predetermined criterion based on the user preference information.

According to an embodiment, the processor is configured to update the user preference information based on the selected other cooking description information.

A computer readable recording medium including a program for executing a controlling method of an electronic apparatus according to yet another embodiment includes a program for executing a controlling method for providing cooking description information for one cooking step from among a plurality of cooking steps included in recipe information, receiving other cooking description information that can replace the displayed cooking description information from an external device, classifying the received other cooking description information according to a predetermined criterion, displaying the classified other cooking description information, and based on one of the displayed other cooking description information being selected, updating the recipe information by replacing the displayed cooking description information with the selected other cooking description information.

Additional aspects will be set forth in part in the description which follows and, in part, will be apparent from the description, or may be learned by practice of the presented embodiments.

BRIEF DESCRIPTION OF THE DRAWINGS

Aspects, features, and advantages of certain embodiments of the present disclosure will be more apparent from the following description taken in conjunction with the accompanying drawings, in which:

FIG. 4B is a view provided to explain an electronic apparatus that changes and displays some cooking description information according to an embodiment;

FIG. 7 is a view provided to explain a controlling method of an electronic apparatus according to various embodiments.

DETAILED DESCRIPTION

Figure 1:
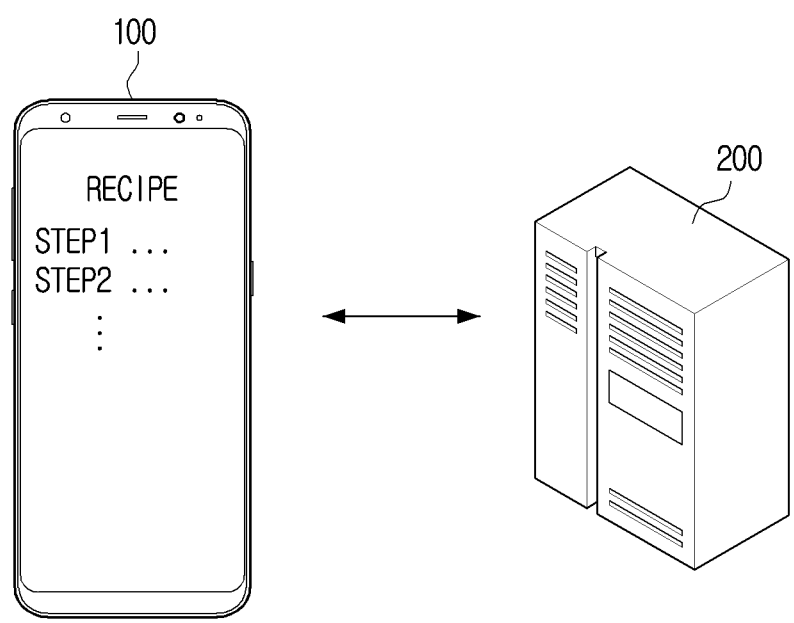
FIG. 1 is a view provided to explain a system including an electronic apparatus and a server according to various embodiments.

Prior to describing the present disclosure in detail, a drafting method of the present specification and drawings will be explained.

The terms used in the specification and the claims are general terms selected in consideration of functions in the disclosure. However, these terms may vary depending on intentions of those skilled in the art, legal or technical interpretation, emergence of new technologies, and the like. Also, some terms may be arbitrarily selected by the applicant. These terms may be construed as meanings defined in the specification, and may be construed based on the entire text of the specification and the common technical knowledge in the art unless specifically defined.

Hereinafter, various embodiments are described with reference to accompanying drawings. However, it should be understood that the drawings accompanied in this disclosure are not intended to limit the technology described in this disclosure to specific embodiments, but include all modifications, equivalents, and/or alternatives according to embodiments of the disclosure.

Also, the same reference numerals or symbols respectively illustrated in the attached drawings denote parts or elements that perform the actually same functions. For convenience of description and understanding, the parts or elements will be described by using the same reference numerals or symbols even in different embodiments. In other words, although elements having the same reference numerals are all illustrated in a plurality of drawings, the plurality of drawings do not mean one embodiment.

A term of a singular number may include its plural number unless explicitly indicated otherwise in the context. It is to be understood that a term "include" or "formed of" used in the specification specifies the presence of features, numerals, steps, operations, components, parts or combinations thereof, which is mentioned in the specification, and does not preclude the presence or addition of one or more other features, numerals, steps, operations, components, parts or combinations thereof.

In the disclosure, an expression "have," "may have," "include," or "may include" indicates existence of a corresponding feature (for example, a numerical value, a function, an operation, or a component such as a part), and does not exclude existence of an additional feature.

In the disclosure, an expression "A or B," "at least one of A and/or B," or "one or more of A and/or B," may include all possible combinations of items enumerated together. For example, "A or B," "at least one of A and B," or "at least one of A or B" may indicate all of 1) a case where at least one A is included, 2) a case where at least one B is included, or 3) a case where both of at least one A and at least one B are included.

Expressions "first" or "second" used in the disclosure may indicate various components regardless of a sequence and/or importance of the components, will be used only to distinguish one component from the other components, and do not limit the corresponding components. For example, use orders or arrangement orders of elements combined with these ordinal numbers are not limited by numbers thereof. The ordinal numbers may be replaced with one another.

When it is mentioned that any component (for example, a first component) is (operatively or communicatively) coupled to or is connected to another component (for example, a second component), it is to be understood that any component is directly coupled to another component or may be coupled to another component through the other component (for example, a third component). On the other hand, when it is mentioned that any component (for example, a first component) is "directly coupled" or "directly connected" to another component (for example, a second component), it is to be understood that the other component (for example, a third component) is not present between any component and another component.

An expression "~configured (or set) to" used in the disclosure may be replaced by an expression "~suitable for," "~having the capacity to," "~designed to," "~adapted to," "~made to," or "~capable of" depending on a situation. A term "~configured (or set) to" may not necessarily mean "specifically designed to" in hardware. Instead, in some situations, an expression "~apparatus configured to" may mean that the apparatus may "do" together with other apparatuses or components. For example, a "~sub-processor configured (or set) to perform A, B, and C" may mean a dedicated processor (for example, an embedded processor) for performing the corresponding operations or a generic-purpose processor (for example, a central processing unit (CPU) or an application processor) that may perform the corresponding operations by executing one or more software programs stored in a memory device.

Meanwhile, in the disclosure, a term "user" may be a person that uses an electronic apparatus or a device that uses an electronic apparatus (e.g., an artificial intelligence electronic apparatus).

Various embodiments of the present disclosure provide an electronic apparatus that modifies and provides some contents of an existing recipe according to a user's food ingredients, cooking device and tastes and a controlling method thereof.

Hereinafter, the present disclosure will be described in detail with reference to accompanying drawings.

FIG. 1 is a view provided to explain an exemplary system in which a technology described in this disclosure may be implemented.

Referring to FIG. 1, the system may include an electronic apparatus 100 and a server 200. The server 200 is a device capable of processing various requests received from the electronic apparatus 100.

According to various embodiments, the server 200 may transmit various information to the electronic apparatus, or receive various information from the electronic apparatus 100. Specifically, the server 200 may transmit recipe information related to a method of cooking food to the electronic apparatus 100, and receive recipe information generated by the electronic apparatus 100 from the electronic apparatus 100.

The recipe information in the disclosure refers to information for a method of cooking food, and means cooking description information regarding each of a plurality of cooking steps required to cook food. The recipe information may include various information such as information on the type and amount of ingredients required to cook food, how to prepare ingredients, cooking method, plating information, and how to enjoy the food. It is illustrated and described that the recipe information in the disclosure is provided to the electronic apparatus 100 in the form of a text, but is not limited thereto. The recipe information may be provided in the form of an image, a voice, or a combination of at least one of a text, an image or a voice.

Meanwhile, the server 200 may provide recipe information to the electronic apparatus 100 based on various user information such as ingredients, cooking device owned by the user, the user's health information, food preference information (or preference information), schedule information, diet management information, etc.

To this end, the server 200 may communicate with a refrigerator (not illustrated) to receive image information from a storage in the refrigerator (not illustrated) from the refrigerator, and identify ingredients held by the owner based on the received image information. Alternatively, the server 200 may directly receive information regarding ingredients possessed by the user from a user terminal device such as the electronic apparatus 100. In addition, the server 200 may receive user information from a cooking device (not illustrated) connected to the electronic apparatus 100 to obtain information regarding a cooking device owned by the user (e.g., oven, microwave oven, induction stove, etc.), or directly receive information regarding an electronic apparatus owned by the user from a user terminal device such as the electronic apparatus 100. Further, the server 200 may receive various user information such as the user's health information, food preference information (or preference information), or schedule information, diet management information from a user terminal device such as the electronic apparatus 100.

In addition, the server 200 may receive and store recipe information regarding food not only from the electronic apparatus 100 but also from other user's electronic apparatus (not illustrated). The server 200 may provide recipe information received from other electronic apparatus (not illustrated) to the electronic apparatus 100. In this case, the server 200 may provide cooking description information regarding all cooking steps included in the recipe information to the electronic apparatus 100 or provide cooking description information regarding some cooking steps to the electronic apparatus 100.

In FIG. 1, only one server is illustrated, but the server 200 may include a plurality of servers such as a recipe providing server that stores recipes and a user server that stores user information.

The electronic apparatus 100 may receive recipe information from the server 200 and provide the same to a user. Alternatively, the electronic apparatus 100 may generate recipe information using an application or a program included in the electronic apparatus 100 and provide the generated recipe information to a user.

In addition, the electronic apparatus 100 may update recipe information displayed on the electronic apparatus 100. Specifically, the electronic apparatus 100 may change some of recipe information generated by the electronic apparatus 100 or cooking description information included in recipe information of other user, which is received through the server, according to a user's situation or preference.

In this case, the electronic apparatus 100 may receive cooking description information from the server 200 in order to update recipe information. In the disclosure, the cooking description information means information describing a cooking method for each step of cooking food.

The server 200 may select at least one cooking description information from among a plurality of pieces of cooking description information based on user information such as ingredients or cooking device owned by the user, the user's health information, food preference information (or preference information), schedule information, or diet management information, and provide the selected cooking description information to the electronic apparatus 100.

The electronic apparatus 100 may change cooking description information included in the recipe by selectin one of the cooking description information received from the server 200.

Accordingly, the electronic apparatus 100 may provide recipe information including cooking description information suitable for the user's situation or preference.

In FIG. 1, the electronic apparatus 100 is illustrated as a smartphone, but is not limited thereto. The electronic apparatus 100 may include at least one of tablet PC, mobile phone, e-book reader, desktop PC, laptop PC, netbook computer, workstation, TV, server, PDA, portable multimedia player (PMP), camera, or wearable device. Alternatively, the electronic apparatus 100 may include at least one of refrigerator, microwave oven, oven, induction stove, hood system, or home automation panel.

Hereinafter, the configuration and operation of the electronic apparatus 100 will be described in greater detail with reference to FIGS. 2 and 6.

Figure 2:
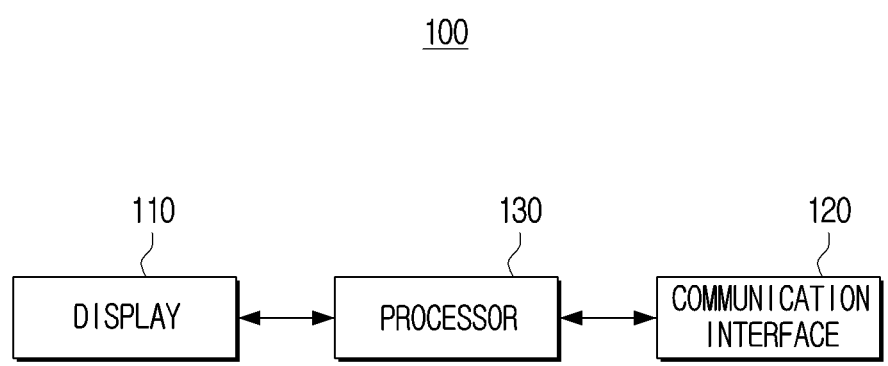
FIG. 2 is a block diagram provided to explain configuration of an electronic apparatus according to an embodiment.

FIG. 2 is a block diagram provided to explain configuration of an electronic apparatus according to an embodiment.

As illustrated in FIG. 2, the electronic apparatus 100 includes a display 110, a communication interface 120 and a processor 130.

The display 110 may provide a user with various screens. Here, the screen may include various content screens such as an image, a video text or music, or various screens such as a web page screen or an application execution screen.

In addition, the display 110 may display recipe information. Specifically, the display 110 may display cooking description information regarding a plurality of cooking steps included in the recipe information. In this case, the display 110 may display the recipe information together with an image or a video.

In addition, the display 110 may display a Graphic User Interface (GUI) screen for receiving a user input. Specifically, the display 110 may display various GUI screens such as a UI screen for receiving a user input that selects one of the cooking description information received from the server 200, a UI screen for receiving a user input that changes the type or amount of ingredients included in the cooking description information or a UI screen for receiving a user input that inputs the user's taste or preference.

The display 110 may be implemented as various types of displays such as Liquid Crystal Display (LCD), Organic Light Emitting Diodes (OLED) display, Plasma Display Panel (PDP), Wall, Micro Light Emitting Diodes (Micro LED), etc. The display 110 may also include a driving circuit that can be implemented in the form of Amorphous Silicon Thin-Film Transistor (a-si TFT), low temperature poly silicon Thin-Film Transistor (LTPS TFT), Organic Thin-Film Transistor (OTFT), etc., a backlight unit, etc. Meanwhile, the display 110 may be implemented as a touch screen combined with a touch sensor, a flexible display, a three-dimensional display (3D display), etc.

In addition, the display 110 according to an embodiment may include not only a display panel that outputs a screen but also a bezel that houses the display panel. In particular, the bezel according to an embodiment may include a touch sensor (not illustrated) for detecting a user interaction.

The communication interface 120 is a component for the electronic apparatus 100 to perform communication with other electronic apparatuses such as the server 200 or a cooking device (not illustrated).

The electronic apparatus 100 may receive recipe information or cooking description information from the server through the communication interface 120, and transmit various signals such as a recipe request signal as well as user information and information such as recipe information generated by the electronic apparatus 100 to the server 200.

Meanwhile, the electronic apparatus 100 may control the communication interface 120 to transmit cooking description information or a cooking setting command to various cooking devices (not illustrated) such as oven, induction stove, microwave oven, and air fryer based on cooking description information included in recipe information.

The communication interface 120 may include various communication modules such as a wired communication module (not illustrated), a near-field wireless communication module (not illustrated), a wireless communication module (not illustrated), etc.

Here, the wired communication module is a module for performing communication with an external device (not illustrated) according to a wired communication method such as wired Ethernet. The near-field wireless communication module is a module for performing communication with an external device (not illustrated) located in a short distance according to a near-field wireless communication method such as Bluetooth (BT), Bluetooth Low Energy (BLE), ZigBee method, etc. The wireless communication module is a module connected to an external network according to a wireless communication protocol such as WiFi, IEEE, etc. to perform communication with an external device (not illustrated) and a voice recognition server (not illustrated). In addition, the wireless communication module may further include a mobile communication module that connects to a mobile communication network according to various mobile communication standards such as 3rd Generation (3G), 3rd Generation Partnership Project (3GPP), Long Term Evolution (LTE), LTE Advanced (LTE-A), 5th Generation Network (5G Networks), etc. to perform communication.

The processor 130 may be electrically connected to a memory (not illustrated) to control the overall operations and functions of the electronic apparatus 100. For example, the processor 130 may drive an operating system or an application program to control hardware or software components connected to the processor 130, and perform various data processing and calculations. In addition, the processor 130 may load and process commands or data received from at least one of the other components into a volatile memory, and store various data in a non-volatile memory.

To this end, the processor 130 may be implemented as a dedicated processor (for example, an embedded processor) for performing a corresponding operation or a general-purpose processor (for example, a central processing unit (CPU) or an application processor (AP)) capable of performing corresponding operations by executing one or more software programs stored in a memory device.

In the disclosure, the processor 130 may be implemented as a digital signal processor (DSP) that processes a digital signal, a microprocessor, or a time controller (TCON). However, the processor 130 is not limited thereto, and may include one or more of the central processing unit (CPU), a micro controller unit (MCU), a micro processing unit (MPU), a controller, the application processor (AP), the graphics-processing unit (GPU), a communication processor (CP), or Address Resolution Protocol (ARP) processor, or may be defined by these terms. In addition, the processor 130 may be implemented in a system-on-chip (SoC) or a large scale integration (LSI), in which a processing algorithm is embedded, or may be implemented in the form of a field programmable gate array (FPGA).

The processor 130 may control the display 110 to display a content including a method of cooking food. In this case, the content including a method of cooking food may include an image, a video, a text and a combination thereof including cooking description information regarding cooking steps.

The processor 130 may generate recipe information a plurality of cooking steps for cooking food by analyzing an image, a voice and a text included in a text and cooking description information regarding each of the plurality of cooking steps.

In addition, the processor 130 may receive user information such as ingredients and cooking devices owned by a user, the user's health information, food preference information, schedule information, and diet management information from the server 200, and generate personal recipe information optimized for the user based on the recipe information generated from the content. This will be described in detail later with reference to FIG. 6.

The processor 130 may control the display 110 to display the generated recipe information or personal recipe information.

In addition, the processor 130 may receive other cooking description information from the server 200 based on a user input for changing cooking description information included in the recipe information or personal recipe information.

The processor 130 may classify the received other cooking description information according to a predetermined criterion, and control the display 110 to display the classified other cooking description information. In this case, the processor 130 may control the display 110 to display a GUI screen for receiving a user input for selecting other cooking description information.

According to another embodiment, the processor 130 may control the display 110 to display a GUI screen for the user to directly input the type and amount of ingredients, the user's taste or preference based on the user input for changing the cooking description information included in the recipe information or personal recipe information.

When receiving a user input for selecting other cooking description information received from the server 200 or a user input for directly inputting the type or amount of ingredients, the user's taste or preference, the processor 130 may update recipe information or personal recipe information by changing cooking information based on the user input. This will be described with reference to FIGS. 3A to 3C, and FIGS. 4A and 4B.

Meanwhile, the components illustrated in the electronic apparatus 100 of FIG. 2 may be changed as at least one component is added, changed or deleted in accordance with the performance and/or type of the electronic apparatus 100. In addition, it will be easily understood by those skilled in the art that the positions of the components may be changed in response to the performance or structure of the electronic apparatus 100.

For example, the electronic apparatus 100 may further include a memory (not illustrated) or a speaker (not illustrated).

The memory (not illustrated) is a component for storing various programs, data, etc. necessary for the operations of the electronic apparatus 100.

The memory (not illustrated) may store an application or a program for generating a recipe from a content output by the electronic apparatus 100, and store recipe information generated by the electronic apparatus 100, recipe information received from the server 200, or cooking description information and various user information (ingredients, cooking devices, user health information, user preference information, schedule information, diet management information, etc.) to be transmitted to the server 200.

The memory (not illustrated) may be implemented as a non-volatile memory, a volatile memory, a flash memory, a hard disc drive (HDD), a sold state drive (SSD), etc. The memory (not illustrated) may be accessed by the processor 130, and reading/recording/modifying/deleting/updating of data by the processor (not illustrated) may be performed. The term of 'memory' in the disclosure may include a ROM (not illustrated) in the memory (not illustrated) and the processor 130, a RAM (not illustrated) or a memory card (not illustrated) (e.g., a micro SD card, a memory stick) mounted on the electronic apparatus 100.

The speaker (not illustrated) is a component for outputting not only audio data included in a content but also various messages or notification sounds. The speaker (not illustrated) may output audio data where various processing tasks such as decoding, amplification and noise filtering are performed by an audio processor. In particular, the speaker (not illustrated) may output cooking description information included in recipe information.

Figure 3A:
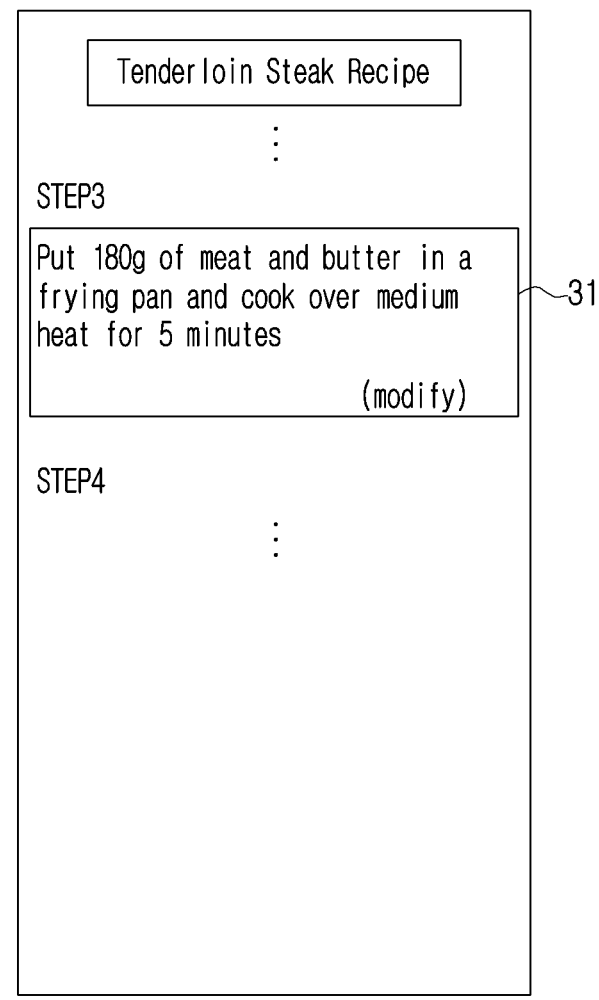
FIG. 3A is a view provided to explain an electronic apparatus that displays cooking description information included in a recipe according to an embodiment.
Figure 3B:
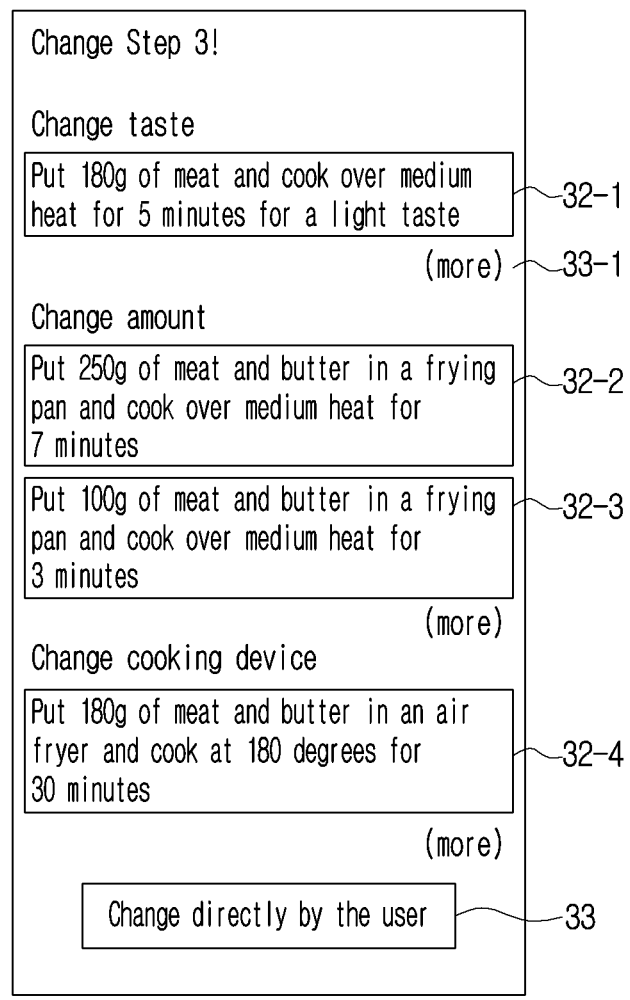
FIG. 3B is a view provided to explain an electronic apparatus that changes some cooking description information included in a recipe according to an embodiment.
Figure 3C:
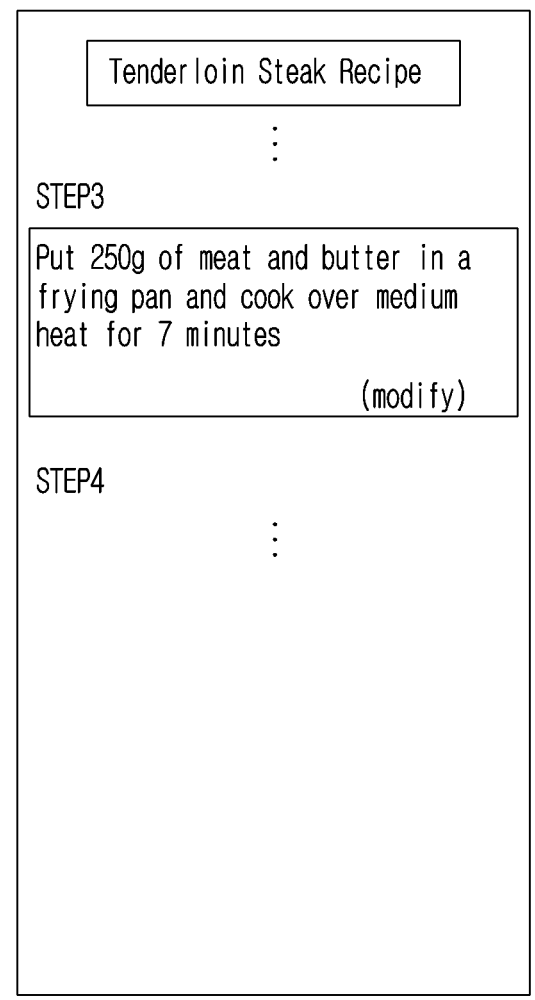
FIG. 3C is a view provided to explain an electronic apparatus that replaces cooking description information with other cooking description information and displays it according to an embodiment.

FIGS. 3A to 3C are views provided to explain an electronic apparatus that updates recipe information by replacing cooking description information with other cooking description information according to an embodiment. FIGS. 3A to 3C illustrate a screen displayed on the display 110 of the electronic apparatus 100.

FIG. 3A is a view provided to explain an electronic apparatus that displays cooking description information included in recipe information, FIG. 3B is a view provided to explain an electronic apparatus that displays other cooking description information received from a server, and FIG. 3C is a view provided to explain an electronic apparatus that replaces the cooking description information included in the recipe information with other cooking description information and displays the replaced cooking description information.

As illustrated in FIG. 3A, the processor 130 may control the display 110 to display cooking description information 31. Specifically, the processor 130 may control the display 110 to display a plurality of cooking steps and the cooking description information 31 regarding one of the plurality of cooking steps using recipe information including cooking description information regarding each of the plurality of cooking steps.

In this case, the cooking description information 31 displayed on the display 110 may be recipe information generated by analyzing a content for cooking food or cooking description information included in personal recipe information generated by reflecting user information. However, this is only an example, and the cooking description information 31 may be cooking description information included in recipe information received from the server 200 or an external device (not illustrated), not recipe information generated by the electronic apparatus 100.

The processor 130 may receive an event for changing the cooking description information 31. For example, the processor 130 may receive a user input for selecting the cooking description information 31 to be changed, or receive a user input for selecting a UI (e.g., '(modify)') displayed together with the cooking description information 31 to be changed. Alternatively, the processor 130 may receive a user voice command such as "show me other cooking description information regarding STEP 3."

When receiving such an event, the processor 130 may request other cooking description information corresponding to the selected cooking description information from the server 200, and receive other cooking description information that can replace the displayed cooking description information from the server 200. In this case, the processor 130 may receive other cooking description information including a cooking device or ingredients owned by the user from the server 200 based on information regarding a cooking device or ingredients owned by the user of the electronic apparatus 100.

The processor 130 may control the display 110 to display other cooking description information received from the server 200.

As illustrated in FIG. 3B, the processor 130 may control the display 110 to classify and display other cooking description information according to a predetermined criterion. Here, the predetermined criterion may be least one of a plurality of elements included in the cooking description information such as a cooking method, the type of ingredients, the amount of ingredients and a cooking device. Here, the predetermined criterion may vary according to the cooking target included in the recipe information. In other words, the predetermined criterion may be set and display differently according to the characteristics of the object to be cooked. For example, if the cooking target included in the recipe information is steak, the degree of backing may be displayed, and if the cooking target is pasta, the texture of the noodle (or degree of cooking) may be displayed.

To this end, the processor 130 may compare the cooking description information 31 with other cooking description information (32-1, 32-2, 32-3, and 32-4) received from the server 200.

Specifically, the processor 130 may recognize a keyword and meaning included in each of the cooking description information 31 and other cooking description information (32-1, 32-2, 32-3, and 32-4) using a module capable of analyzing the meaning of cooking description information such as a keyword extraction module and a semantic analysis module. In the disclosure, the keyword extraction module and the semantic analysis module may be modules included in a Natural Language Understanding (NLU) module.

In addition, the processor 130 may identify a difference between the cooking description information 31 and other cooking description information (32-1, 32-2, 32-3, and 32-4) using the recognized keyword and meaning. For example, the processor 130 may identify whether there is a difference between the cooking description information 31 and other cooking description information (32-1, 32-2, 32-3, and 32-4) in terms of the taste of food, the amount of ingredients, the type of ingredients, and the type of a cooking device.

The processor 130 may control the display 110 to classify and display other cooking description information (32-1, 32-2, 32-3, and 32-4) according to a predetermined criterion using the difference identified as a result of comparing the cooking description information 31 and other cooking description information (32-1, 32-2, 32-3, and 32-4). For example, if there is a difference in 'the amount of ingredients' between the other cooking description information (32-2, 32-3) and the cooking description information 31 as a result of comparing the cooking description information 31 and other cooking description information (32-1, 32-2, 32-3, and 32-4), other cooking description information may be classified and displayed based on 'the amount of ingredients' that is a predetermined criterion by grouping other cooking description information (32-2 and 32-3).

Meanwhile, considering that the amount of information that can be displayed on the display 110 at one time is limited while the amount of information of other cooking description information received from the server 200 may be large, the processor 130 may control the display 110 to display only some of the other cooking description information received from the server 200.

In this case, the processor 130 may display only some of the other cooking description information using user preference information. Here, the user preference information means at least one of the taste of food, the type of ingredients, the amount of ingredients or a cooking device. The user preference information may be generated by a user input, or may be generated based on a history of the user's selection of other cooking description information. For example, if other cooking description information that gives a spicy taste has been selected many times among other cooking description information received from the server 200, the processor 130 may generate user preference information indicating that the user prefers a spicy taste.

The processor 130 may select at least one other cooking description information among other cooking description information received from the server 200 based on user preference information, and control the display 110 to classify and display the selected at least one other cooking description information according to the above-described predetermined criterion.

For example, if the user preference information indicates that the user prefers a cooking method using an air fryer from among a plurality of cooking devices and a cooking method using a smaller amount of ingredients than usual, the processor 130 may select other cooking description information using an air fryer from other cooking description information received from the server 200, and classify and display the selected other cooking description information according to predetermined criteria of 'cooking device' and 'amount of ingredients.'

Meanwhile, the processor 130 may determine the order of other cooking description information that is classified and displayed according to a predetermined criterion. Specifically, the processor 130 may determine the order of at least one other cooking description information that is classified according to a predetermined criterion based on user preference information. For example, if other cooking description information including a light taste is selected more than other cooking description information that changes the amount of ingredients from among a plurality of pieces of other cooking description information, the processor 130 may determine the order of other cooking description information so that other cooking description information corresponding to the predetermined criterion of 'taste of food' is displayed before other cooking description information corresponding to the predetermined criterion of 'amount of ingredients'.

In addition, the processor 130 may control the display 110 to arrange and display at least one other cooking description information according to a predetermined order.

When one of the arranged and displayed other cooking description information (32-1, 32-2, 32-3, and 32-4) is selected as illustrated in FIG. 3B, the processor 130 may control the display 110 to replace the cooking description information 31 displayed on the display 110 before the other cooking description information is received with the selected other cooking description information and display the selected other cooking description information as illustrated in FIG. 3C.

In this case, the processor 130 may update user preference information based on the selected other cooking description information.

Meanwhile, the processor 130 may further provide other cooking description information in addition to at least one other cooking description information displayed based on the user's preference. To this end, the processor 130 may control the display 110 to display a UI 33-1 for receiving a user input for additionally requesting other cooking description information.

Meanwhile, it is described that a predetermined criterion is displayed at each step included in a recipe, but the disclosure is not limited thereto.

According to another embodiment, when a recipe is selected, the processor 130 may control the display 110 to first display a predetermined criterion regarding a cooking target included in the recipe before cooking information regarding the first step of the recipe is displayed. The processor 130 may receive a user input for selecting at least one of a plurality of displayed predetermined criteria. The processor 130 may control the display 110 to change and display cooking description information of each cooking step based on the user input.

For example, regarding a chop steak recipe, the processor 130 may control the display 110 to first display a predetermined criterion such as 'change the degree of cooking' or 'change the taste' before cooking information for each step of the recipe is displayed. When 'change the degree of cooking: medium' and 'change the taste: spicy' is selected by the user, recipe information may be generated and displayed by updating information of cooking steps based on the selected criteria. In this case, the change of the degree of cooking may be reflected by changing the intensity/time of fire in the cooking step, and the change of the taste may be reflected by changing the ingredients and proportions in the step of making the sauce.

In addition, the processor 130 may control the display 110 to display each cooking step in which the user's selection is reflected. In this case, the processor 130 may control the display 110 to display that the corresponding step is updated information and to display information about which one of a plurality of predetermined criteria has been applied to the change.

Meanwhile, according to yet another embodiment, the processor 130 may display a UI 33 for receiving a user request for directly change cooking description information.

Figure 4A:
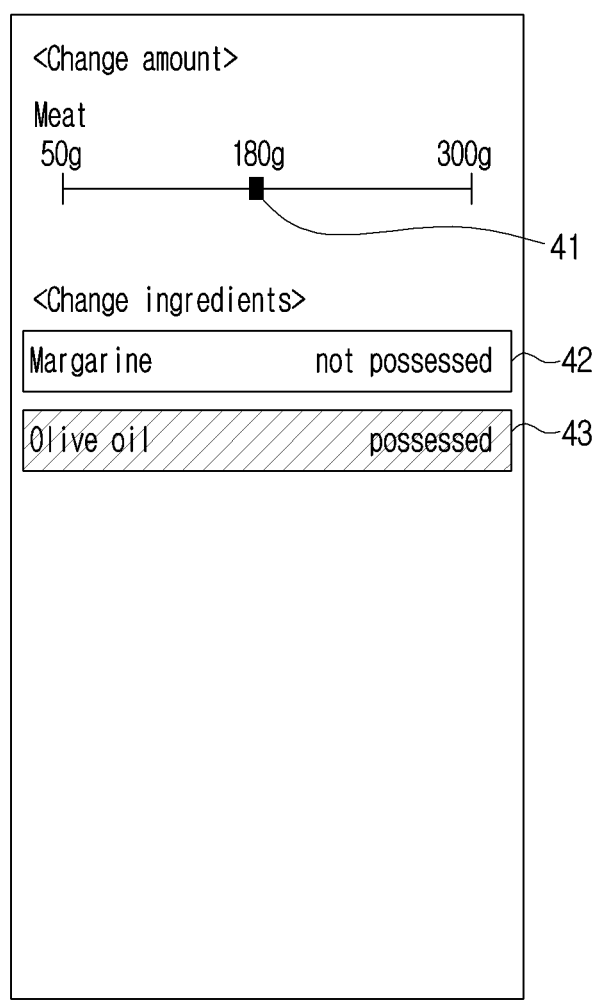
FIG. 4A is a view provided to explain an electronic apparatus that displays a UI for changing some cooking description information according to an embodiment.

FIG. 4 is a view provided to explain a case in which the UI 33 of FIG. 3B is selected according to an embodiment. FIGS. 4A and 4B are views illustrating a screen displayed on the display 110 of the electronic apparatus 100.

When the UI 33 is selected and a user request for directly changing cooking description information is received, the processor 130 may identify a cooking element included in the displayed cooking description information 31.

Specifically, the processor 130 may identify cooking elements such as the type of ingredients, the amount of ingredients, a cooking device, and the taste of food included in the cooking description information 31 using a keyword extraction module and a semantic analysis module.

The processor 130 may control the display 110 to display a screen including UIs (41, 42 and 43) for changing the identified elements as illustrated in FIG. 4A.

In this case, the processor 130 may display a UI for changing cooking elements using user information (e.g., information on cooking devices or ingredients owned by the user) stored in a memory (not illustrated). According to another embodiment, the processor 130 may analyze the amount or type of ingredients by analyzing an image of ingredients captured through a camera (not illustrated) before cooking food, and display a UI for changing cooking elements based on the information regarding the analyzed amount or type of ingredients. According to yet another embodiment, the processor 130 may obtain information regarding alternative ingredients (e.g., margarine, olive oil) that can replace ingredients (e.g., butter) included in the cooking description information 31, and display a UI including information regarding the obtained alternative ingredients. In this case, the processor 130 may also display whether the user has the alternative ingredients.

When receiving a user input for changing cooking elements through the UI displayed on the screen, the processor 130 may control the display 110 to change and display the cooking description information 31 based on the user input. For example, when a user input for changing the amount of meat to 300 g by moving the UI 41 to the right in FIG. 4A and selecting olive oil 43 is received, the processor 130 may generate and display cooking description information as illustrated in FIG. 4B by replacing the amount of meat and butter included in the cooking description information 31.

In this case, the processor 130 may obtain information regarding a cooking time or a cooking method according to the new amount of ingredients, the new type of ingredients and the new cooking device from a memory (not illustrated) or the server 200, and change a cooking time or a cooking method included in the cooking description information based on the obtained information.

According to yet another embodiment, there may be a case in which a UI 42 displayed as an ingredient not possessed by the user may be selected. In this case, the processor 130 may identify that the ingredient displayed as an ingredient not possessed by the user is actually possessed by the user, and update the ingredient information possessed by the user.

Meanwhile, when the recipe information is updated by replacing the cooking description information 31 as illustrated in FIGS. 3C and 4B, the updated recipe information may be transmitted to the server 200 and shared with other users. In this case, the updated recipe information may include the user's selection information, that is, information regarding according to which criterion the cooking information is selected among cooking information according to a predetermined criterion.

In addition, the processor 130 may transmit a cooking setting command according to the new cooking description information to a cooking device included in the newly displayed cooking description information.

Figure 5:
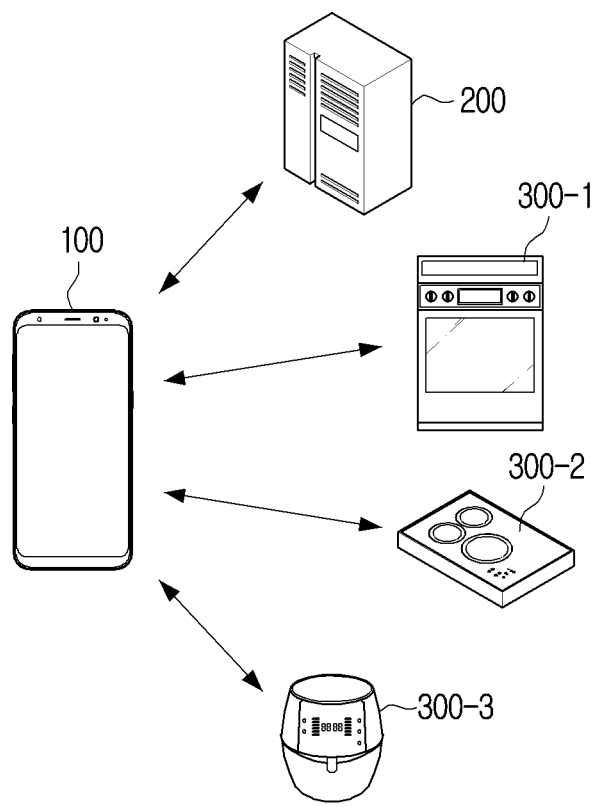
FIG. 5 is a view provided to explain an electronic apparatus that performs communication with a server and a cooking device according to an embodiment.

FIG. 5 is a view provided to explain an electronic apparatus that performs communication with a server or other cooking device. As illustrated in FIG. 5, the electronic apparatus 100 may be connected to cooking devices (300-1, 300-2 and 300-3) possessed by the user in addition to the server 200.

The processor 130 may control the cooking devices (300-1, 300-2 and 300-3) using an application or a program stored in the electronic apparatus 100. Specifically, the processor 130 may generate a command for controlling the cooking devices (300-1, 300-2 and 300-3), and transmit the generated control command to the cooking devices (300-1, 300-2 and 300-3).

The processor 130 may identify a cooking device and a cooking method included in cooking description information. Here, the cooking description information indicates cooking description information that is newly displayed by the user's selection or input as illustrated in FIGS. 3C and 4B, but is not limited thereto. According to an embodiment, cooking description information displayed in the recipe information before being updated may be included.

Specifically, the processor 130 may identify a cooking device and a cooking method included in cooking description information using a keyword extraction module and a semantic analysis module.

The processor 130 may generate a setting command of a cooking device based on cooking description information displayed on the display 110. In this case, the setting command of the cooking device means a command for setting an operation menu such as the mode, heating temperature, and operation time of the cooking device in order to operate the cooking device according to the contents of the cooking description information.

The processor 130 may control the communication interface 120 to transmit a setting command to the cooking device that is identified as being included in the cooking description information.

As such, the cooking devices (300-1, 300-2 and 300-3) are set according to the cooking description information and thus, the user inconvenience of separately setting the operation of the cooking devices (300-1, 300-2 and 300-3) may be reduced.

Figure 6:
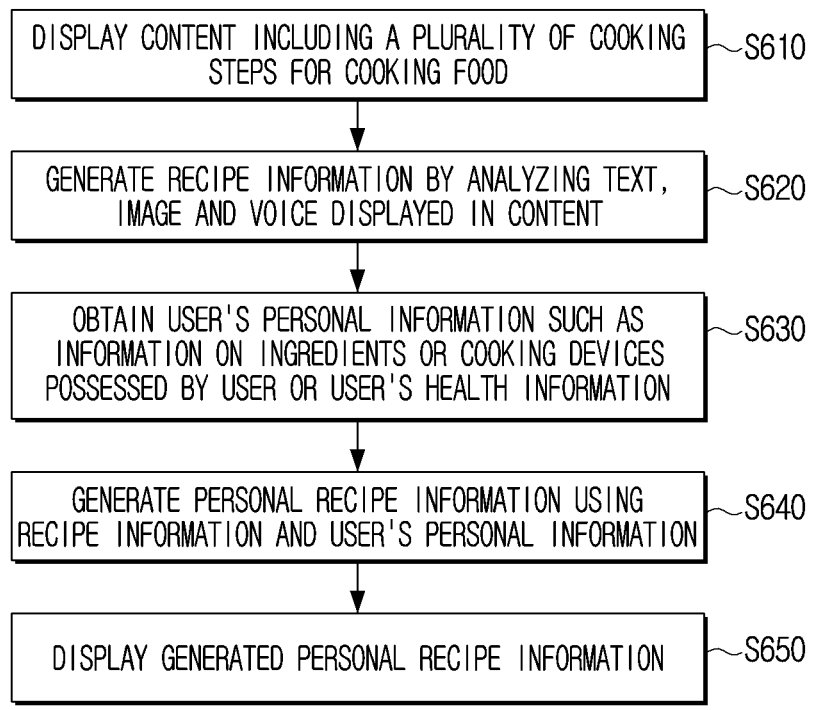
FIG. 6 is a view provided to explain an electronic apparatus that creates and displays recipe information according to an embodiment.

FIG. 6 is a view provided to explain an electronic apparatus that creates and displays recipe information according to an embodiment.

As described above with respect to FIG. 2, the recipe information displayed on the display 110 may be recipe information generated by the electronic apparatus 100.

The processor 130 may control the display 110 to display a content including a plurality of cooking steps for cooking food (S610). Here, the content may include an image, a video, a text or a combination thereof including cooking description information for each cooking step for cooking food.

The processor 130 may generate recipe information by analyzing an image, a voice and a text displayed in the content (S620).

The processor 130 may identify a text included in the content, and check the meaning of the identified text using a keyword extraction module and a semantic analysis module. The processor 130 may identify a cooking operation and a cooking method for a plurality of cooking steps based on the checked meaning of the text.

In addition, the processor 130 may identify a cooking operation and a cooking method included in an image using an artificial intelligence model trained to identify objects included in the image and identify a situation indicated by the user's operation or image by distinguishing a person and an object in the identified objects. In this case, when the image is a video, the processor 130 may identify scene editing information such as zoom in/out of the scene and transition of the scene using an artificial intelligence model, distinguish each cooking step based on the identified scene editing information, and check a cooking operation and a cooking method regarding each cooking step.

The processor 130 may analyze a voice included in a content using a voice recognition model. The processor 130 may analyze voice data output from the content using a keyword extraction module and a semantic analysis module, and check a cooking operation and a cooking method regarding each step by identifying a plurality of cooking steps included in the content.

The processor 130 may generate cooking description information regarding each of the plurality of steps based on the cooking operation and the cooking method identified as a result of an image, a voice and a text, and generate recipe information including the generated cooking description information.

Meanwhile, the processor 130 may obtain user information such as ingredient information possessed by the user (type or amount of ingredients), cooking device information, the user's taste (preference information), the user's health information, and the user schedule information (S630). Specifically, the processor 130 may receive user information from the server 200 through the communication interface 120.

The processor 130 may generate personal recipe information using the recipe information generated in S620 and the user information generated in S630 (S640). The processor 130 may generate personal recipe information optimized for the user by changing the type of ingredients, the amount of ingredients, cooking device, the taste of food included in the recipe information.

The processor 130 may display the generated personal recipe information (S650). Meanwhile, the processor 130 may display not only the personal recipe information but also the recipe information generated in S620.

As described above with reference to FIGS. 3 and 4, the processor 130 may update the displayed recipe information by changing cooking description information regarding one cooking step among cooking description information regarding a plurality of cooking steps included in the recipe information displayed on the display 110.

FIG. 7 is a view provided to explain a controlling method of an electronic apparatus according to various embodiments.

Firstly, a content including a plurality of cooking steps for cooking food may be obtained. In this case, the content may be received from the server 200 or an external device such as other electronic apparatus (not illustrated).

Subsequently, recipe information regarding the content may be generated by analyzing the obtained content.

In this case, at least one piece of information from information on ingredients possessed by the user of the electronic apparatus 100 (amount or type of ingredients), cooking device information, the user's preference information or the user's health information may be obtained, and personal recipe information may be generated using the generated recipe information by analyzing the obtained at least one piece of information and content.

Recipe information generated by analyzing content or personal recipe information generated from recipe information generated by analyzing content may be displayed. Hereinafter, recipe information generated by analyzing content or personal recipe information is described as recipe information.

Specifically, cooking description information for one cooking step from among a plurality of cooking steps may be displayed using recipe information including a plurality of cooking steps for cooking food and cooking description information for each of the plurality of cooking steps (S710).

Other cooking description information that can replace the displayed cooking description information may be received from the server 200 (S720). In this case, other cooking description information including cooking devices or ingredients possessed by the user may be received from the server 200 based on information on cooking devices or ingredients possessed by the user of the electronic apparatus 100.

In addition, the received other cooking description information may be classified and displayed according to a predetermined criterion (S730).

Specifically, a difference between the displayed cooking description information and other cooking description information may be identified, and the identified difference may be classified and displayed according to a predetermined criterion. In this case, a difference regarding at least one of the taste of food, the type of ingredients, the amount of ingredients, the cooking device, or the cooking time may be identified, and other cooking description information may be classified and displayed according to the identified difference.

In this case, at least one other cooking description information from other cooking description information may be selected based on the user's preference information, and the selected at least one other cooking description information may be classified and displayed according to a predetermined criterion. In this case, the user's preference information may include the user's preference information regarding at least one of the taste of food, the type of ingredients, the amount of ingredients, or a cooking device.

At least one cooking description information classified according to a predetermined criterion may be arranged and displayed based on the user's preference information.

When one of the displayed other cooking description information is selected, recipe information may be updated by replacing the displayed cooking description information with the selected other cooking description information (S740). In this case, the user's preference information may be updated based on the selected other cooking description information.

The updated recipe information may be transmitted to the server 200, and may be shared with other users. The updated recipe information may include the user's selection information, that is, information regarding according to which criterion the cooking information is selected among cooking information according to a predetermined criterion.

In addition, the cooking device included in the selected other cooking description information may be identified, and a setting command for the cooking device identified based on the selected other cooking description information may be generated and transmitted to the identified cooking device. Accordingly, the cooking device may be set to operate according to the recipe information without the user's separate setting of the cooking device according to the cooking description information.

Meanwhile, although it has been described above that a predetermined criterion is displayed in each step included in the recipe, but the present disclosure is not limited thereto.

For example, according to another embodiment, a predetermined criterion for a cooking target may be displayed first before cooking information regarding a first step of a recipe is displayed. In addition, a user input for selecting at least one of a plurality of predetermined criteria displayed may be received. Subsequently, by reflecting the user input, cooking description information for each cooking step may be changed and displayed.

For example, in a chop steak recipe, a predetermined criterion such as 'baking change' and 'taste change' may be displayed before cooking information for each step of the recipe is displayed. Subsequently, when the user selects 'baking change: medium' and 'taste change: spicy', a recipe may be generated and displayed by updating the information for cooking steps based on the selected criterion. In this case, the baking change may be reflected by changing the intensity/time of fire in the cooking step of grilling the steak, and the taste change may be reflected by changing the ingredients, proportions, etc. in the cooking step of making the sauce.

Subsequently, each cooking step where the user's selectin is reflected may be displayed. In this case, it is possible to display that the cooking step reflecting the user's selection is updated information, and to display according to which criterion the cooking step has changed from among a plurality of predetermined criteria.

In the above description, various operations described as being performed through at least one of the electronic apparatus 100, the server 200 or the cooking device 300 may be performed through one or more electronic apparatuses in the form of a controlling method of an electronic apparatus or a controlling method or an operation method of a system including the electronic apparatus.

Meanwhile, the various embodiments described above may be implemented in a computer or a recording medium readable by a similar device using software, hardware, or a combination of software and hardware.

When implemented as hardware, the embodiments described in the disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or electrical units for performing functions.

In some cases, the embodiments described in the disclosure may be implemented by the processor itself. When implemented as software, the embodiments such as procedures and functions described in the specification may be implemented by separate software modules. Each of the software modules may perform one or more functions and operations described in the specification.

Meanwhile, computer instructions for performing processing operations in a user device or a manager device according to various embodiments of the above-described present disclosure may be stored in a non-transitory computer-readable medium. When executed by a processor of a specific device, the computer instructions stored in such a non-transitory computer-readable medium cause the processing operations of the user device and/or manager device according to the above-described various embodiment to be performed by the above-described specific device.

The non-transitory readable medium means a medium that semi-permanently stores data and is readable by a device, not a medium that stores data for a short period of time such as a register, a cache, a memory, or the like. Specifically, various applications or programs described above may be stored and provided in a non-transitory computer readable medium such as a compact disk (CD), a digital versatile disk (DVD), a hard disk, a Blu-ray disk, a universal serial bus (USB), a memory card, or a read only memory (ROM).

Although embodiments of the disclosure have been illustrated and described herein, the disclosure is not limited thereto, and various modifications may be made by those of ordinary skill in the art without departing from the gist of the disclosure defined in the appended claims and should not be understood separately from the technical idea or prospect of the disclosure.

What is claimed is:

1. A controlling method of an electronic apparatus, comprising:

displaying cooking description information for one cooking step from among a plurality of cooking steps included in recipe information;
receiving a modification to the cooking description information that can replace the displayed cooking description information from an external device;
classifying the received modification to the cooking description information according to a predetermined criterion;
displaying the classified modification to the cooking description information; and
based on the displayed modification to the cooking description information being selected, displaying the selected modification to the cooking description information or a combination of the displayed cooking description information and the selected modification to the cooking description information;
by analyzing a content including the plurality of cooking steps, generating recipe information regarding the content;
obtaining health information of the user; and
generating personal recipe information using the generated recipe information and the obtained health information,
wherein the displaying cooking description information comprises displaying cooking description information regarding one cooking step from among the plurality of cooking steps using the generated personal recipe information.

2. The method as claimed in claim 1, wherein the classifying comprises identifying a difference from the received modification to the cooking description information based on the displayed cooking description information, and classifying the identified difference according to the predetermined criterion.

3. The method as claimed in claim 2, wherein the classifying comprises identifying a difference in at least one of a taste of food, a type of food, an amount of food, or a cooking device.

4. The method as claimed in claim 1, wherein
the receiving further comprises:
receiving modifications to the cooking description information that can replace the displayed cooking description information from the external device, and
the classifying further comprises:
selecting at least one other modification to the cooking description information from the received modifications to the cooking description information based on user preference information, and
classifying the selected at least one other modification to the cooking description information of the modifications to the cooking description information according to the predetermined criterion,
wherein the user preference information includes user preference information regarding at least one of a taste of food, a type of food, an amount of food, or a cooking device.

5. The method as claimed in claim 4, wherein the classifying comprises classifying at least one other modification to the cooking description information according to the predetermined criterion based on the user preference information.

6. The method as claimed in claim 1, further comprising:
updating user preference information based on the selected modification to the cooking description information.

7. The method as claimed in claim 1, wherein the receiving further comprises, based on information on a cooking device or ingredients owned by a user of the electronic apparatus, receiving the modification to the cooking description information including the cooking device or the ingredients owned by the user.

8. The method as claimed in claim 1, further comprising:
identifying a cooking device included in the selected modification to the cooking description information;
generating a setting command of the identified cooking device based on the selected modification to the cooking description information; and
transmitting the setting command to the identified cooking device.

9. The method as claimed in claim 1, further comprising:
obtaining at least one information from among information on ingredients owned by a user of the electronic apparatus, or a cooking device owned by the user; and
wherein the generating the personal recipe information further includes:
generating the personal recipe information using the generated recipe information, the obtained health information, and the obtained at least one information.

10. An electronic apparatus comprising:
a display;
a communication interface configured to perform communication with an external device; and
a processor configured to:
control the display to display cooking description information for one cooking step from among a plurality of cooking steps included in recipe information;
receive a modification to the cooking description information that can replace the displayed cooking description information from the external device through the communication interface;
classify the received modification to the cooking description information according to a predetermined criterion;
control the display to display the classified modification to the cooking description information; and
based on the displayed modification to the cooking description information being selected, control the display to display the selected modification to the cooking description information or a combination of the displayed cooking description information and the selected modification to the cooking description information;
by analyzing a content including the plurality of cooking steps, generate recipe information regarding the content;
obtain health information of the user; and
generate personal recipe information using the generated recipe information and the obtained health information,
wherein the displayed cooking description information comprises cooking description information regarding one cooking step from among a plurality of cooking steps included in the generated personal recipe information.

11. The apparatus as claimed in claim 10, wherein the processor is further configured to:
identify a difference from the received modification to the cooking description information based on the displayed cooking description information,
classify the identified difference according to the predetermined criterion, and control the display to display the classified identified difference.

12. The apparatus as claimed in claim 11, wherein the processor is further configured to identify a difference in at least one of a taste of food, a type of food, an amount of food, or a cooking device.

13. The apparatus as claimed in claim 10, wherein the processor is further configured to:
receive modifications to the cooking description information that can replace the displayed cooking description information from the external device through the communication interface,
select at least one other modification to the cooking description information from the received modifications to the cooking description information based on user preference information; and
classify the selected at least one other modification to the cooking description information of the modifications to the cooking description information according to the predetermined criterion,
wherein the user preference information includes user preference information regarding at least one of a taste of food, a type of food, an amount of food, or a cooking device.

14. The apparatus as claimed in claim 13, wherein the processor is further configured to classify the selected at least one other modification to the cooking description information according to the predetermined criterion based on the user preference information.

15. The apparatus as claimed in claim 13, wherein the processor is further configured to update the user preference information based on the selected at least one other modification to the cooking description information.

16. The apparatus as claimed in claim 10, wherein the processor is further configured to:
based on information on a cooking device or ingredients owned by a user of the electronic apparatus, receive the modification to the cooking description information including the cooking device or the ingredients owned by the user.

17. The apparatus as claimed in claim 10, wherein the processor is further configured to:
identify a cooking device included in the selected modification to the cooking description information; and
generate a setting command of the identified cooking device based on the selected modification to the cooking description information and transmit the setting command to the identified cooking device.

18. The apparatus as claimed in claim 10, wherein the processor is further configured to:
obtain at least one information from among information on ingredients owned by a user of the electronic apparatus or a cooking device owned by the user; and
wherein the generated personal recipe information further includes:
generate the personal recipe information using the generated recipe information, the obtained health information, and the obtained at least one information.

19. A non-transitory computer readable recording medium storing computer instructions that cause an electronic apparatus to perform an operation when executed by a processor of the electronic apparatus, the operation comprising:
displaying cooking description information for one cooking step from among a plurality of cooking steps included in recipe information;
receiving a modification to the cooking description information that can replace the displayed cooking description information from an external device;
classifying the received modification to the cooking description information according to a predetermined criterion;
displaying the classified modification to the cooking description information; and
based on the displayed modification to the cooking description information being selected, displaying the selected modification to the cooking description information or a combination of the displayed cooking description information and the selected modification to the cooking description information;
by analyzing a content including the plurality of cooking steps, generating recipe information regarding the content;
obtaining health information of the user; and
generating personal recipe information using the generated recipe information and the obtained health information,
wherein the displaying cooking description information comprises displaying cooking description information regarding one cooking step from among the plurality of cooking steps using the generated personal recipe information.

* * * * *